US012658072B2

(12) United States Patent

Malone

(10) Patent No.: US 12,658,072 B2

(45) Date of Patent: Jun. 16, 2026

(54) METHOD FOR RENDERING MATHEMATICAL MODELS OF SYSTEMS INTO INTERACTIVE TRAINING SIMULATORS

(71) Applicant: Terry L. Malone, Berea, OH (US)

(72) Inventor: Terry L. Malone, Berea, OH (US)

( * ) Notice: Subject to any disclaimer, the term of this patent is extended or adjusted under 35 U.S.C. 154(b) by 115 days.

(21) Appl. No.: 18/490,106

(22) Filed: Oct. 19, 2023

(65) Prior Publication Data

US 2024/0135836 A1     Apr. 25, 2024
US 2024/0233576 A9     Jul. 11, 2024

Related U.S. Application Data

(60) Provisional application No. 63/380,152, filed on Oct. 19, 2022.

(51) Int. Cl.
    *G09B 23/02*     (2006.01)
(52) U.S. Cl.
    CPC ..................................... *G09B 23/02* (2013.01)
(58) Field of Classification Search
    CPC ...................................................... G09B 23/02
    See application file for complete search history.

(56) References Cited

U.S. PATENT DOCUMENTS 6,371,765 B1   4/2002   Wall et al.
6,755,659 B2   6/2004   LoSasso et al.
7,165,017 B2 *   1/2007   Paterson ................ G16H 50/50
                                             703/22
7,280,991 B1   10/2007   Beams et al.
7,565,280 B2   7/2009   Moriat
7,856,410 B2   12/2010   Burgess et al.
7,921,047 B2   4/2011   Schlunk
8,014,992 B2   9/2011   Smith
8,353,704 B2   1/2013   Kortas et al.
8,360,787 B2   1/2013   Zorba, Sr. et al.
8,786,613 B2   7/2014   Millman
10,671,060 B2   6/2020   Abbaszadeh et al.
2003/0046041 A1 *   3/2003   Copel .................... G05B 17/02
                                             703/2
2004/0015813 A1   1/2004   Yerushalmy
2008/0033897 A1   2/2008   Lloyd (Continued)

*Primary Examiner* — Eddy Saint-Vil

(74) *Attorney, Agent, or Firm* — Dunlap Bennett & Ludwig PLLC

(57) ABSTRACT

A system for rendering interactive simulations is provided. The system includes an interactive display screen and one or more physical nodes to which users can selectively assign values. The interactive display screen is enabled to provide a visual representation of a simulation for a systemic model which may be driven by one or more mathematical equations. Each model, by way of one or more mathematical equations, has one or more parameters. The interactive display screen is enabled to define one or more node location for each parameter. The interactive display screen provides one-way communication via each node location. As a result, when a node is physically placed on a node location, the one-way communication assigns or configures that node to a simulation parameter. The user may then select a value for that simulation parameter, which in turn influences the simulation being represented on the interactive display screen.

11 Claims, 6 Drawing Sheets

(56)                References Cited

U.S. PATENT DOCUMENTS

| | | | |
|---|---|---|---|
| 2008/0052049 A1* | 2/2008 | Moriyama | G06F 30/20 |
| | | | 703/2 |
| 2017/0103678 A1 | 4/2017 | Gingher et al. | |
| 2018/0203238 A1 | 7/2018 | Smith, Jr. | |
| 2021/0294826 A1* | 9/2021 | Chen | H04L 51/234 |

* cited by examiner

500

METHOD FOR RENDERING MATHEMATICAL MODELS OF SYSTEMS INTO INTERACTIVE TRAINING SIMULATORS

CROSS-REFERENCE TO RELATED APPLICATION

This application claims the benefit of priority of U.S. provisional application No. 63/380,152, filed 19 Oct. 2022, the contents of which are herein incorporated by reference.

BACKGROUND OF THE INVENTION

The present invention relates to simulation models and, more particularly, a method for rendering mathematical models of systems into interactive training simulators for business and education purposes as well as entertainment, wherein users interact with the system models using physical representations of the system model components that are adjustable in real-time.

Simulators are often used to support training, research, and business decision making in many areas, often requiring unique hardware and/or software to build system models and resulting simulators, many requiring specialized skills. The current approach requires significant time and resource investments and has proven to be prohibitively expensive for many individuals and organizations.

Many other modeling and simulation tools require the user to learn specific processes, procedures, and syntaxes to build models across different disciplines. Other modeling systems do not have the capabilities to independently modify system components in real-time using physical representations of the system model components. Other modeling systems require software interfaces to change system components and associated parameters. Other modeling systems do not support distributed system modeling and collaborative simulations across multiple locations and platforms.

Furthermore, most modeling systems do not have physical nodes that can be used to modify model components and associated parameters. In other words, current systems do not have physical components for the models that can be used to modify the system in real-time, this limitation leads to longer time periods for model changes, reduced user engagement, and reduced visualization, negatively impacting effectiveness, and the like. Additionally, current systems are not conducive to group activities in the physical and virtual realms and does not promote real-time experimentation, impacting speed to solution.

As can be seen, there is a need for a method for rendering mathematical models of systems into interactive training simulators for business and education purposes as well as entertainment, wherein users interact with the system models using physical representations of the system model components that are adjustable in real-time, and wherein the invention uses common software and hardware to build system models from mathematical equations.

SUMMARY OF THE INVENTION

The present invention eliminates the need for specialized hardware and/or software to build a wide range of system models and resulting simulations to support business, education, and entertainment, reducing the reliance on specialized skills, tools, and limited resources.

By having individual physical components for the system model, changes can be made in real-time by multiple users, enhancing collaboration. Users can easily change model component parameters, encouraging experimentation and rapid development and learning. The present invention enables users to leverage the system to model various systems without learning new tools and investing in different hardware and software or learning new syntaxes. The ability to easily associate graphics, video, and audio with system models and simulations enhances user engagement and overall simulation value.

System models are graphically displayed and updated in real-time as simulations are run. Users interact with the system models using physical representations of the system model components ("nodes"), adjustable in real-time. These physical nodes can be used to adjust model parameters without the need for special tools or programming knowledge. This method can be used for all system models that can be represented by mathematical equations.

The system models can be constructed by simply entering a mathematical equation for the system being modeled, thereby eliminating the need to manually connect system components logically, since connections and relevant parameters are automatically derived from the mathematical equation. The same software and hardware can be used to model any system that can be represented by mathematical equations. The effectiveness of the system model simulation is enhanced by the addition of user selected graphics, audio, video, and the physical hands-on nature of the system. System models can easily be scaled due to the ability to have distributed system models across multiple remote platforms. Therefore, simulations can be run in collaboration with remote users. Note, distributed systems may require that different users in different locations would each need their own STEM-Sim Board 3 in addition to their own STEM-Sim Node 4.

In one aspect of the present invention, a system for rendering interactive simulations, the system providing: a display screen capable for representing a simulation for a model having one or more parameters, the display screen defining a node location for each parameter; and a node enabled to be configured only by its physical placement on the node location so that a value associated with the node is imputed to the parameter of the model.

In another aspect of the present invention, the system for rendering interactive simulations may further include, wherein the node further comprises a node display configured to represent said value, wherein the node is configured for a user to selectively set said value, wherein the node comprises a light-sensing component, wherein the display screen comprises a digital encoding flash component for a one-way communication to the node by way of the light-sensing component, and wherein the one-way communication via the digital encoding flash component is limited to each node location.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, the present invention embodies a system for rendering interactive simulations. The system includes an interactive display screen and one or more physical nodes to which users can selectively assign values. The interactive display screen is enabled to provide a visual representation of a simulation for a systemic model which may be driven by one or more mathematical equations. Each model, by way of one or more mathematical equations, has one or more components, variables, or parameters associated with the simulation. The interactive display screen is enabled to define one or more node location along its upper surface. Each node location is associated with one of the simulation parameters. The interactive display screen also provides one-way communication, also through its upper surface, at each node location. As a result, when a node is physically placed on a node location, the one-way communication assigns or configures that node to a simulation parameter. The user may then select a value for that simulation parameter, which in turn influences the simulation being represented on the interactive display screen.

Referring now to FIGS. 1A through 4, the present invention may include a system for rendering mathematical models of systems into interactive training simulators for business, education, and entertainment, wherein users interact with the system models using physical representations of the system model components that are adjustable in real-time. The systemic components may include the following:

1. STEM-Sim Server—Internet accessible computer server with database and API capabilities.
2. STEM-Sim Controller—Tablet or Laptop computer with Wi-Fi, Bluetooth and the capability to execute software applications. It should be noted that though the Figures show a Bluetooth insignia, that that element in the Figures may include wireless communication of any kind, such as Wi-Fi and the like.
3. STEM-Sim Board—Single board computer with large screen display 31, Wi-Fi (access point hosting) and Bluetooth communications, and with the capability of running applications. The STEM-Sim Board 3 provides an interface or display screen that is capable of both visual representations of a simulation as well as a plurality of node locations; the STEM-Sim Board 3 interface or display screen also enabled to provide different digital encoded light pulses or otherwise sufficient one-way communications selectively to each of a plurality of node locations.
4. STEM-Sim Nodes—One or more hand-held embedded systemic objects with Wi-Fi, graphical display, and light sensing capabilities.

Figure 1A:
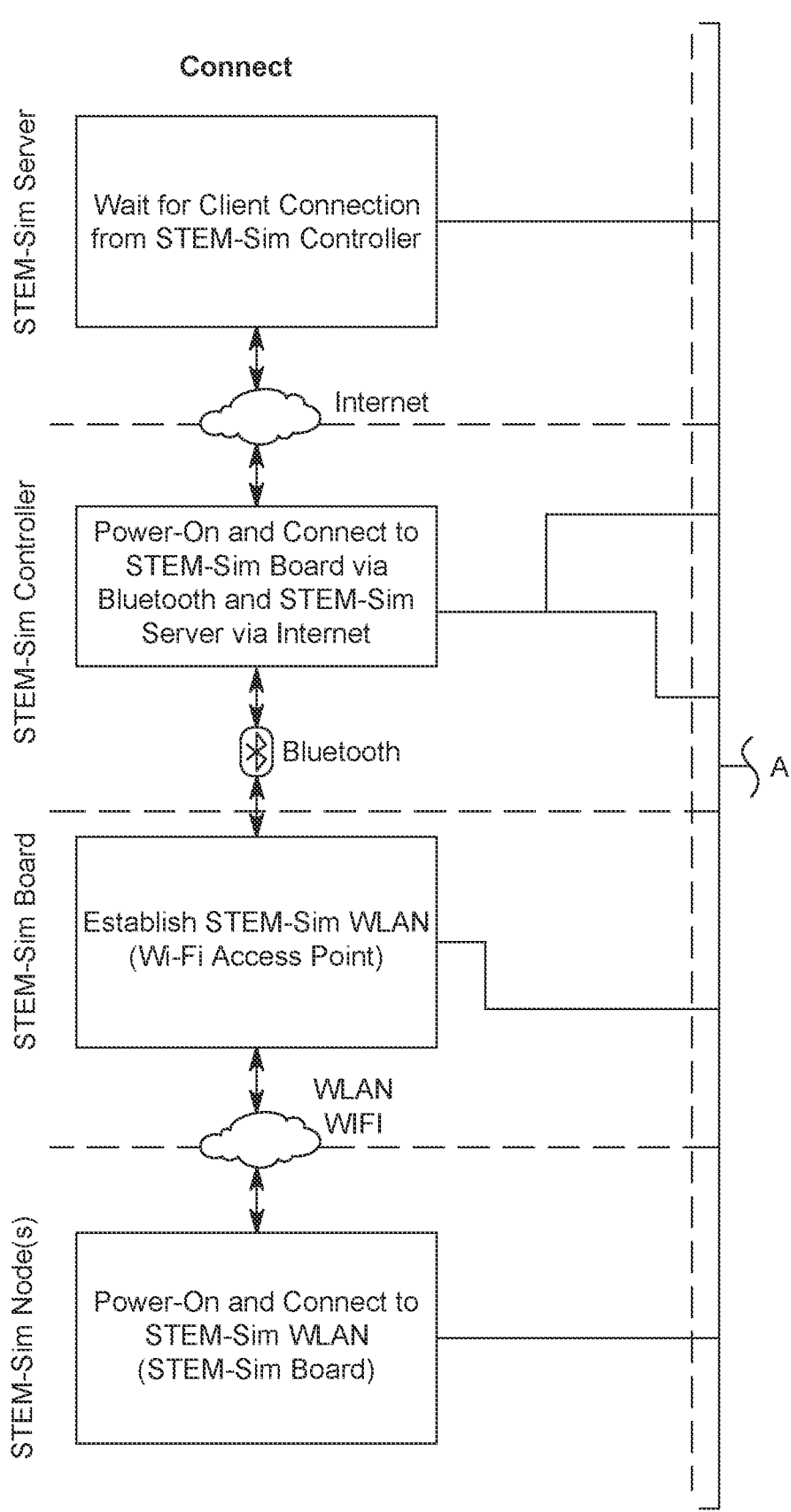
FIG. 1A is a schematic flow chart of an exemplary embodiment of the present invention.
Figure 1B:
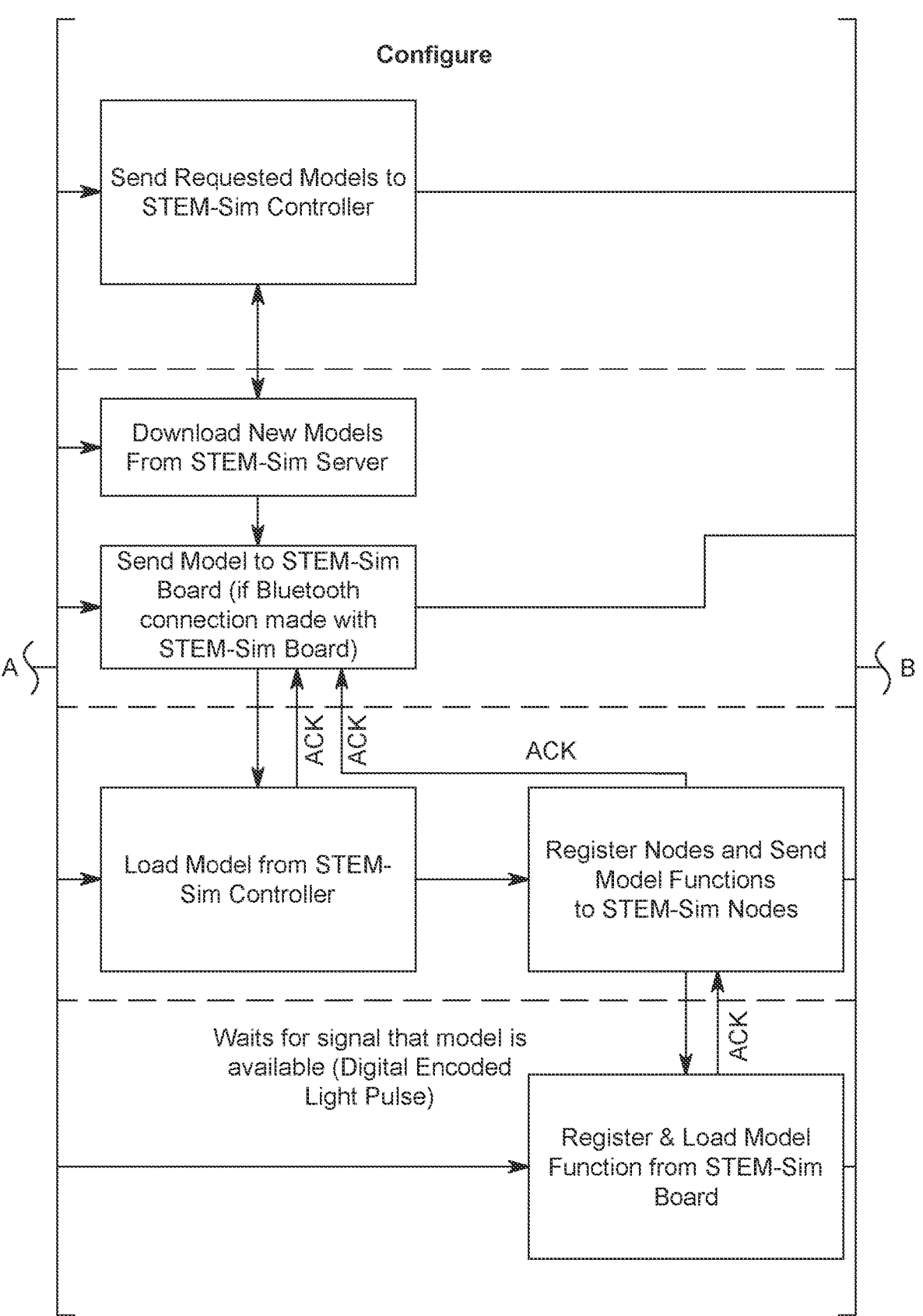
FIG. 1B is a continuation of FIG. 1A.
Figure 1C:
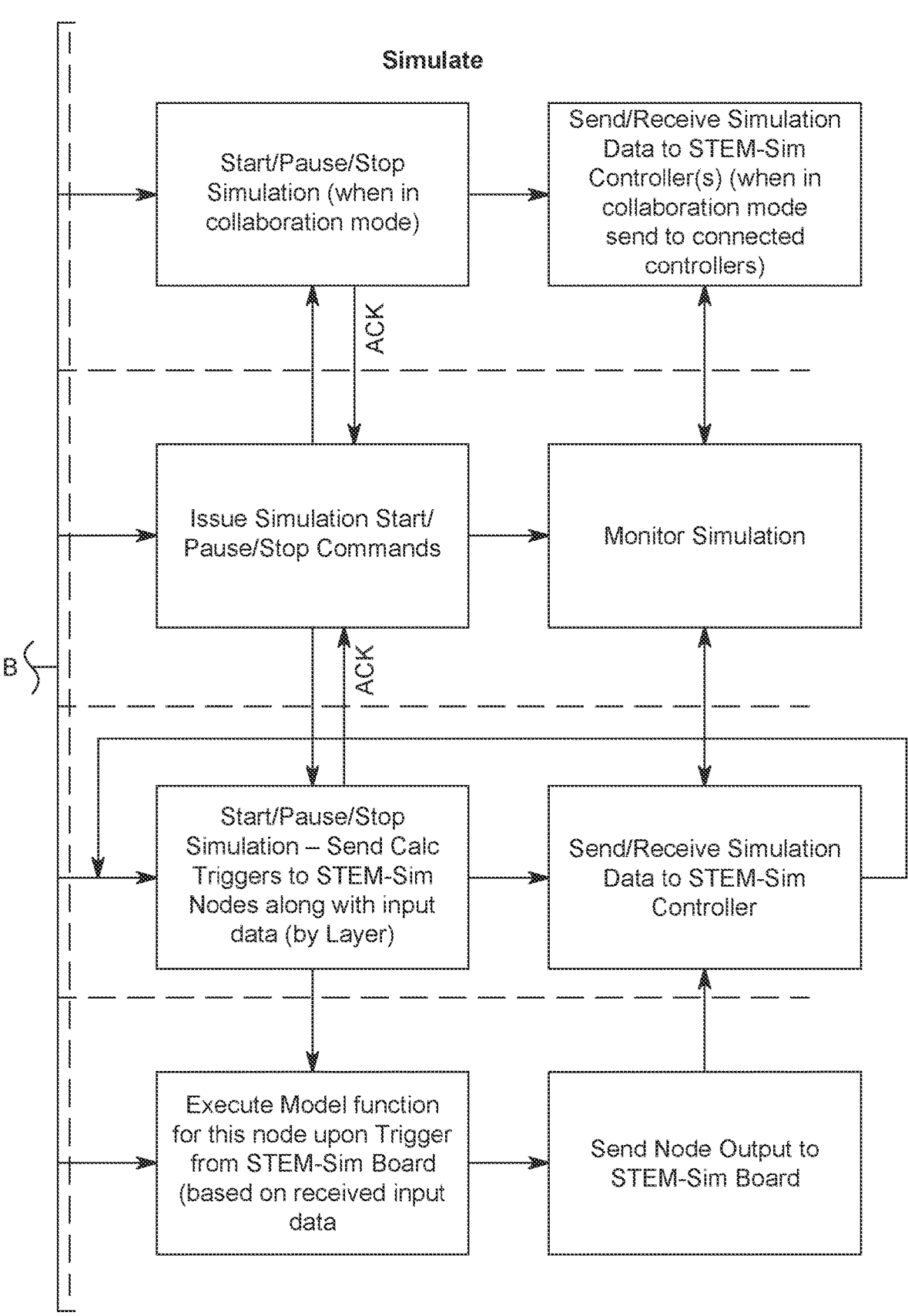
FIG. 1C is a continuation of FIG. 1B.
Figure 2:
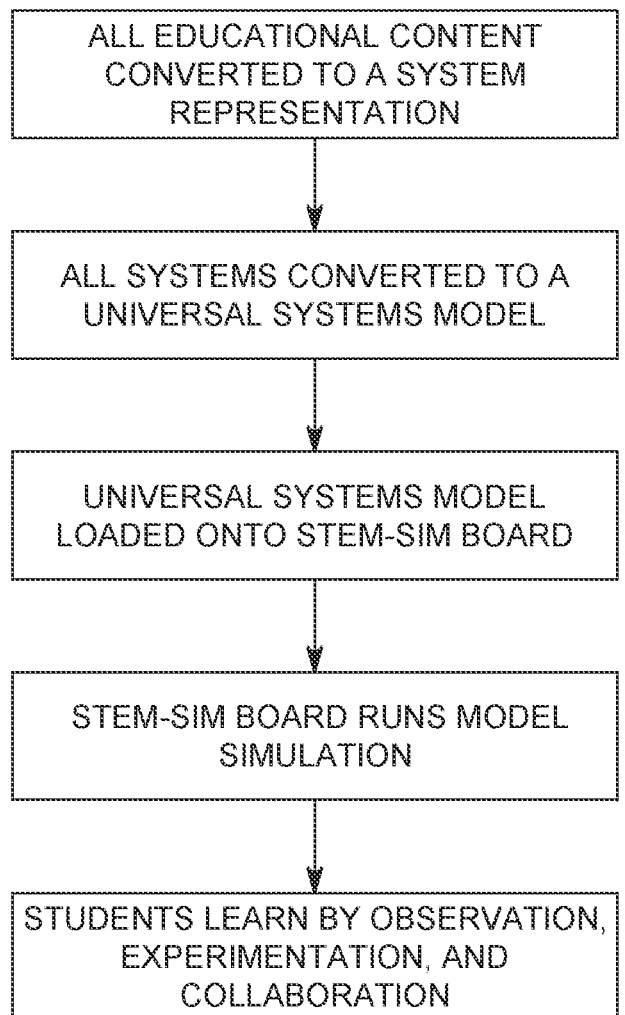
FIG. 2 is a flow chart of an exemplary embodiment of the present invention.
Figure 3:
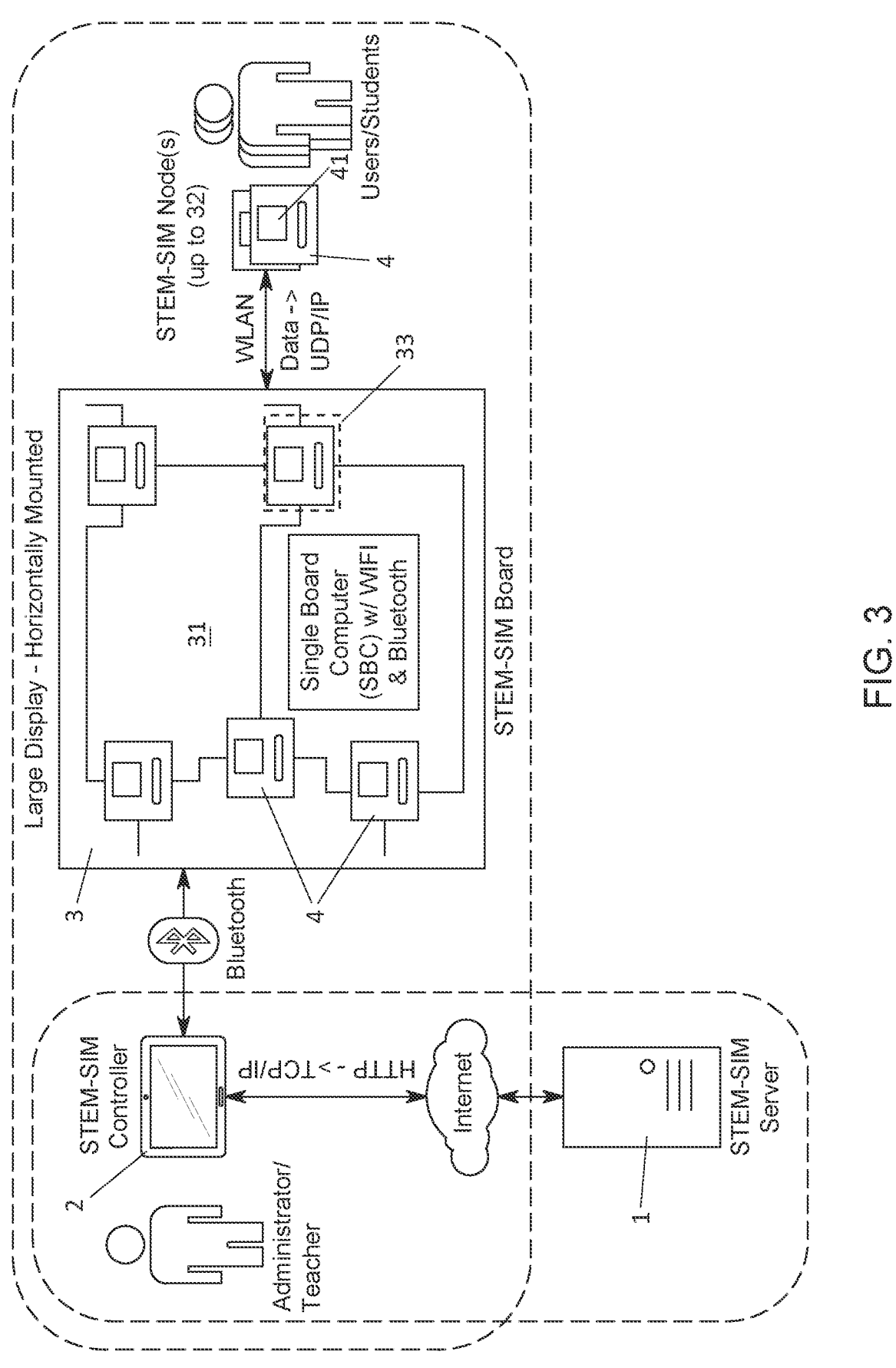
FIG. 3 is a schematic view of an exemplary embodiment of the present invention.

The STEM-Sim Board 3 may provide the large screen display 31 at a horizontal orientation, so that the screen display 31 resembles a tabletop or "board". The screen display 31 is enabled to represent a simulation disclosed herein. The screen display 31 is enabled to represent a plurality of node locations 33 (FIG. 3 illustrates a plurality of STEM-Sim Nodes 4 on such node locations 33, even though it only one node location 33 is identified therein). The STEM-Sim Board 3, in conjunction with the STEM-Sim Server 1 and the STEM-Sim Controller 2, associates each node location 33 with a unique parameter of the related simulation. By way of example, if the Simulation for related to mixing colors to create new colors, each node location 33 would connote one of the three additive primary colors (i.e., three parameters of the color-mixing Simulation). The STEM-Sim Board 3 is configured to project or propagate light-based signals (such as but not limited to digital encoded flashes) via its display screen 31, wherein the light signals would be different for each node location 33. In furtherance of the instant example, the three node locations would be representative of the colors red, blue, and green, respectively, and so the respective light signals would convey data commensurate with each such color/parameter of the color-mixing simulation.

Each STEM-Sim Node 4 has light sensing capabilities along with embedded wireless communication functionality (for receiving and transmitting input and output to and from the STEM-Sim Board 3), a graphical display 41 for displaying a user-controlled setting, and a computer for computing input and output.

The present invention contemplates at least two forms of communication for each STEM-Sim Node 4. First, there is one-way communication via the light signals from the STEM-Sim Board 3 that the STEM-Sim Node 4 can read via its light-sensing capabilities. The light signals/pulses identify the STEM-Sim Node 4 as a parameter of an instant simulation, but only for the STEM-Sim Node 4 physically located on the node location 33 associated with that parameter. There, again, the physical location of a STEM-Sim Node 4 along the display 31 of the STEM-Sim Board 3 defines that STEM-Sim Node 4 properties/parameter for the systemic simulation the STEM-Sim Board is currently running. The second form of communication, by way of the wireless communication, enables the STEM-Sim Node 4 to communicate with the STEM-Sim Board 3 for the purpose of transmitting respective input and input.

The setting or value that a user may selectively choose for the STEM-Sim Node 4 is a property of the parameter for the related simulation. For instance, in the color mixing example, the setting/value may be the intensity of the color that the STEM-Sim Node 4 is associated with. This value is represented on the graphical display 41 of the STEM-Sim Node 4. The data or output associated with this value is wireless transmitted to the STEM-Sim Board 3 for evaluation in the context of the simulation.

The computer element of the STEM-Sim Node 4 is needed for, in some embodiments, to compute input from the STEM-Sim Board 3 to modify the user-inputted value for non-linear simulation. For example, in instances where there are multiple users, each with their own respective STEM-Sim Node 4 physically located on their respective node locations 33 (and thus operatively associated with the STEM-Sim Board 3 system model), and wherein a value of one STEM-Sim Node 4 is a function of another systemic STEM-Sim Node 4, a user of one STEM-Sim Node 4 modifying their respective node value may automatically modify the value for another systemic STEM-Sim Node 4; thus, the computer is need for such calculations.

The STEM-Sim Controller 2 connects to the STEM-Sim Server 1 over the internet to download system model files and to send information to the STEM-Sim Server 1 to support distributed system models simulation sessions. The STEM-Sim Controller 2 also connects to the STEM-Sim Board 3 over Bluetooth or a local Wi-Fi network access point established by the STEM-Sim Board 3, this connection allows the STEM-Sim Controller 2 to push the system model files to the STEM-Sim Board 3 to run system model simulations. Each STEM-Sim Node 4 connects to the STEM-Sim Board 3 over a local Wi-Fi network access point established by the STEM-Sim Board 3. The connection between the STEM-Sim Board 3 and the STEM-Sim Nodes 4 support data communications and control messaging during system simulations.

Each active STEM-Sim Node 4 has a one-way communications channel (from the STEM-Sim Board 3 to the STEM-Sim Node 4) to the STEM-Sim Board 3 over a digitally modulated light pulse communications channel. When the STEM-Sim Node 4 is physically placed on the display 31 of the STEM-Sim Board 3 at specific node locations 33 designated by the system model graphic, information can be sent to the STEM-Sim Node 4 from the STEM-Sim Board 3. The information sent to the STEM-Sim Node 4 over, in one embodiment, light pulse communication channel is a trigger to send registration information back to the STEM-Sim Board 3 over the established Wi-Fi communication channel. It being understood that various methods of electronic communications may be employed if these electronic communication methodologies facilitate the functionality disclosed herein. The physical location of the STEM-Sim Node 4 on the STEM-Sim Board 3 may also be established by manually entering the location information. The manual method is not preferred due to the potential of human error.

The invention uses models of systems created from mathematical equations to run system simulations for education, entertainment, business operations, and research. System models can be derived from (but are not limited to) the natural sciences (such as physics, biology, earth science, chemistry), engineering disciplines, (such as mechanical engineering, electrical engineering, civil engineering, and others), and from non-physical areas like the social sciences (economics, psychology, sociology, political science).

A library of system models is stored on the STEM-Sim Server 1, these models are selectively downloaded to the STEM-Sim Controller 2 for running simulations. Available system models are created on the STEM-Sim Server 1 with the model creation application. System models are created programmatically from user-provided mathematical equation(s) and graphics that represent the system being modeled. Information provided during system model creation is processed and packaged into a single system model file and stored on STEM-Sim Server 1 system model library.

The STEM-Sim Controller 2 pushes the downloaded system model file to the STEM-Sim Board 3. The STEM-Sim Board 3 will coordinate the execution of the simulation by first configuring each STEM-Sim Node 4 based on information in the system model file and then synchronizing and sequencing the mathematical calculations performed by the STEM-Sim Node(s) 4 (based on the physical location of the STEM-Sim Node 4 on the display screen 31 of the STEM-Sim Board 3). Real-time information from the running simulation is displayed on the STEM-Sim Board 3 and sent to the STEM-Sim Controller 2 for monitoring and uploading to the STEM-Sim Server 1 for use when collaborative simulations (distributed) are run with other remote STEM-Sim systems. STEM-Sim Nodes 4 are physically placed on the STEM-Sim Board 3 display at the locations corresponding to their function in the system model, locations are marked by the system model graphic (i.e., the node locations 33 may be graphically represented in the display screen 31). During the simulation, each STEM-Sim Node 4 displays its current state or calculated output (i.e., either the user-selected value or a value associated with another node) that the STEM-Sim Board 3 for the parameter during its simulation. User selectable parametric adjustments can be made to the system model using the STEM-Sim Nodes 4 in real-time, via an input interface, impacting the overall system model simulation results.

The overall state of the running system model simulation is controlled from the STEM-Sim Controller 2. The STEM-Sim Controller 2 sends commands to the STEM-Sim Board 3 to control its state, the STEM-Sim Board 3 will in turn issue instructions to the individual STEM-Sim Nodes 4 to control their states. From the STEM-Sim Controller 2, a user can load a system model for simulation, load a previously started simulation of a system model, and save the state of a currently running simulation of a system model. From the STEM-Sim Controller 2, a user can start, pause, and stop running system model simulations.

All communications between the STEM-Controller 2 and the STEM-Sim Board 3 is over a Wi-Fi network access point established by the STEM-Sim Board 3 at startup or Bluetooth. All 2-way communications between the STEM-Sim Board 3 and the STEM-Sim Nodes 4 may also be handled over the local Wi-Fi network access point established by the STEM-Sim Board 3 at startup. There are 1-way communications from the STEM-Sim Board 3 to the STEM-Sim Node(s) 4. The 1-way communications between the STEM-Sim Board 3 and the STEM-Sim Node(s) 4 may occur during the initiation of the system model simulation so as to associate the STEM-Sim Node's 4 physical location and unique identification with the logical association in the system model. The information is needed to trigger calculation sequences and to associate calculation results with the correct system model nodes.

The invention can be made by establishing an internet connected server (STEM-Sim Server 1) with database capabilities and applications to convert mathematical equations to system models that can be simulated and graphically depicted. In addition, configure a laptop or tablet computer (STEM-Sim Controller 2) that can connect to the server (STEM-Sim Server 1) over the internet and to a local Wi-Fi access point simultaneously, develop an application that runs on the STEM-Sim Controller 2 that can download system model files from the STEM-Sim Server 1. Build a single board computer and display (STEM-Sim Board 3) that can establish a local Wi-Fi network access point and receive system model files from the STEM-Sim Controller 2 over that Wi-Fi network or Bluetooth. Build handheld embedded devices (STEM-Sim Node(s) 4) capable of connecting to a local Wi-Fi network access point and capable of performing mathematical calculations and displaying data. The STEM-Sim Node(s) 4 should be capable of sensing and interpreting digitally encoded light pulsed data.

The STEM-Sim Server 1, STEM-Sim Controller 2, STEM-Sim Board 3, and STEM-Sim Node(s) 4 are all necessary for the invention to work.

A person would utilize the invention by first identifying the system they would like to simulate, this could be for educational purposes, research, entertainment or for generating information to support business decision making. The user would first browse the list of existing system models to see if a system model already exists to meet their identified need. If a system model already exists in the library of system models on the STEM-Sim server 1, the user will download the system model file for running the desired simulation. An appropriate model can also be created if one does not already exist in the library on the STEM-Sim Server 1. Once created, this new model can be added to the library for use by others. New models can be created by using built in functionality on the STEM-Sim Server 1, assessable via an online application. The model is constructed by simply providing the mathematical equations representing the desire system, along with any associated graphics (that can be uploaded to the STEM-Sim Server 1 for the model file build process).

Conceptually, each STEM-Sim Node 4 is "self-configured" based on its placement on the display interface 31 of the STEM-Sim Board 3. That STEM-Sim Node's 4, through its light-sensing capabilities, is imputed as a parameter within the current simulation the STEM-Sim Board 3 is running. The user can selectively modify, by way of the STEM-Sim Node 4, a value associated with that value, that will in turn influence the simulation that the STEM-Sim Board 3 is representing on its display screen 31. Note, the representation of the simulation is adjacent to, juxtaposed to, or incorporates the above-mentioned node location 33 identifiers. Thus, the STEM-Sim Node/Module 4 has no identify prior to being placed on the node location 33, at which time the STEM-Sim Node 4 the encoded digital pulses the STEM-Sim Board 3 associates with that node location 33.

Once the appropriate model is downloaded to the STEM-Sim Controller 2, it is then pushed to the STEM-Sim Board 3 for running an interactive simulation. Using the STEM-Sim Nodes 4 associated with the parameters and variables in the model, adjustments can be made in real-time until the desired information is gained from the running simulation.

It should also be noted that the STEM-Sim Node 4 may not be any conventional computer (such as a off the shelf laptop or mobile device) but rather a physical object with the light sensing capabilities disclosed above, whereby when the interface for its light sensing capability is operatively associated with the node location 33's light signals so that the STEM-Sim Node 4 is configured as a parameter of the instant simulation, while the display 41 of the STEM-Sim Node 4 is readily visible for users to read after they have selectively defined its value.

Additionally, nearly every system can be modeled as one or more mathematical equations, by using this invention one can model systems from any field of technology and science as well as business systems. These systems models can all be created using the present invention without additional software or hardware or special knowledge beyond their expertise in their chosen field.

Also, the present invention can create a tabular and graphical representation of system model behavior in real-time and over a given period. The present invention can also enable new graphical system models based on provided mathematical equations that can be used to interact with system models in real-time to support education, scientific research, business decision making, and entertainment.

Figure 4:
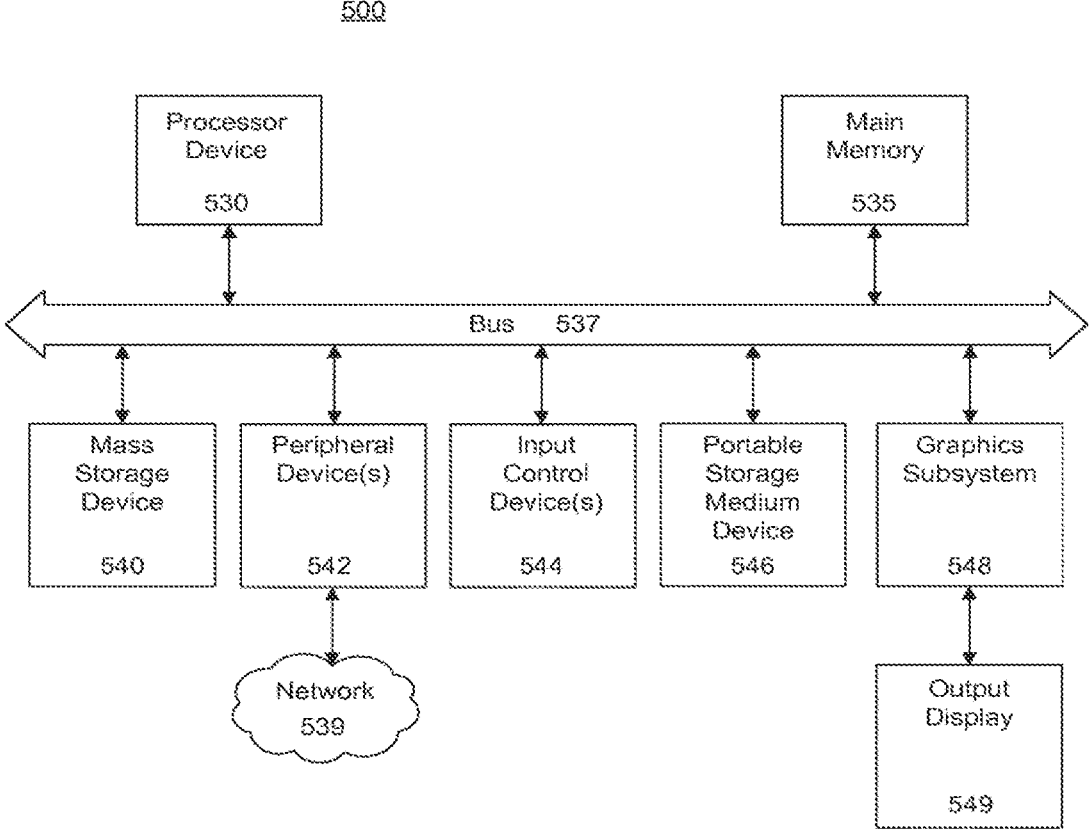
FIG. 4 is a block diagram of a general and/or special purpose computer 500, which may be a general and/or special purpose computing device, according to some example embodiments of the invention.

FIG. 4 is a block diagram of a general and/or special purpose computer 500, which may be a general and/or special purpose computing device, in accordance with some of the example embodiments of the invention. The computer

500 may be, for example, a user device, a user computer, a client computer and/or a server computer, among other things.

The computer 500 may include without limitation a processor device 530, a main memory 535, and an interconnect bus 537. The processor device 530 may include without limitation a single microprocessor, or may include a plurality of microprocessors for configuring the computer 500 as a multi-processor system. The main memory 535 stores, among other things, instructions and/or data for execution by the processor device 530. The main memory 535 may include banks of dynamic random-access memory (DRAM), as well as cache memory.

The computer 500 may further include a mass storage device 540, peripheral device(s) 542, non-transitory storage medium device(s) 546, input control device(s) 544, a graphics subsystem 548, and/or a display 549. For explanatory purposes, all components in the computer 500 are shown in FIG. 4 as being coupled through the bus 537. However, the computer 500 is not so limited. Devices of the computer 500 may be coupled through one or more data transport means. For example, the processor device 530 and/or the main memory 535 may be coupled through a local microprocessor bus. The mass storage device 540, peripheral device(s) 542, portable storage medium device(s) 546, and/or graphics subsystem 548 may be coupled via one or more input/output (I/O) buses. The mass storage device 540 may be a non-volatile storage device for storing data and/or instructions for use by the processor device 530. The mass storage device 540 may be implemented, for example, with a magnetic disk drive or an optical disk drive. In a software embodiment, the mass storage device 540 is configured for loading contents of the mass storage device 540 into the main memory 535.

The portable storage medium device 546 operates in conjunction with a nonvolatile portable storage medium, such as, for example, a compact disc read only memory (CD-ROM), to input and output data and code to and from the computer 500. In some embodiments, the software for storing information may be stored on a portable storage medium, and may be inputted into the computer 500 via the portable storage medium device 546. The peripheral device(s) 542 may include any type of computer support device, such as, for example, an input/output (I/O) interface configured to add additional functionality to the computer 500. For example, the peripheral device(s) 542 may include a network interface card for interfacing the computer 500 with a network 439.

The input control device(s) 544 provide a portion of the user interface for a user of the computer 500. The input control device(s) 544 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 500 may include the graphics subsystem 548 and the output display 549. The output display 549 may include a cathode ray tube (CRT) display and/or a liquid crystal display (LCD). The graphics subsystem 548 receives textual and graphical information, and processes the information for output to the output display 549.

Each component of the computer 500 may represent a broad category of a computer component of a general and/or special purpose computer. Components of the computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

What is claimed is:

1. A system for rendering interactive simulations, the system comprising:
   one or more physically movable nodes, each physically movable node having an adjustable value;
   a simulation board comprising:
      a display screen configured to represent a simulation for a model having one or more parameters, the display screen defining a node location for each parameter of said one or more parameters;
      a communication functionality enabling communication between the simulation board and each of the one or more of physically movable nodes; and
      for each node location, the simulation board automatically represents an updated simulation based only on the physical placement of one of the one or more physically movable nodes in said node location and the adjustable value of said one physically movable node;
      the simulation board configured to automatically represent an updated simulation when another physically movable node of the one or more physically movable nodes is placed in another node location
   a node enabled to be configured only by its physical placement on the node location so that a value associated with the node is imputed to the parameter of the model.

2. The system of claim 1, wherein each physically movable node further comprises a node display configured to represent said adjustable value.

3. The system of claim 1, wherein the simulation board is configured to automatically represent another updated simulation when another physically movable node of the one or more physically movable nodes is placed in another node location.

4. The system of claim 1, wherein each physically movable node comprises a light-sensing component.

5. The system of claim 4, wherein the display screen comprises a digital encoding flash component for a one-way communication to each physically movable node by way of the light-sensing component.

6. The system of claim 5, wherein the one-way communication via the digital encoding flash component is limited to each node location.

7. The system of claim 1, wherein the simulation board is configured to automatically represent another updated simulation when the adjustable value of said one of the one or more physically movable node is changed.

8. A method for rendering an interactive simulation, the method comprising:
   receiving, via a display screen, a user selection to represent the interactive simulation for a model having one or more parameters, the display screen defining a node location for each parameter of said one or more parameters, wherein the user selection is based on an adjustable value associated with a physically movable node placed on at least one of each node location;
   determining, by a processor, the interactive simulation based on imputing the adjusted value to the parameter of the one or more parameters associated with the node location having a placed physically movable node thereon; and automatically rendering the interactive simulation on the display screen.

9. The method of claim 8, automatically rendering an updated interactive simulation on the display screen when the adjustable value of said placed physically movable node is changed.

10. The method of claim 8, automatically rendering an updated interactive simulation on the display screen when another physically movable node is placed in another node location.

11. An apparatus for rendering interactive simulations, the apparatus comprising:

a plurality of physically movable nodes, each physically movable node having a node communication component;

a simulation board comprising:

an upper surface, wherein the upper surface has a display screen capable for representing a simulation for a model having one or more parameters, the display screen defining a node location for each parameter of said one or more parameters; and a signal component configured to send a parameter-based signal to each node location; and wherein each physically movable node is enabled to be configured only by its physical placement on the node location when the node communication component is in communication with the signal component, so that a value associated with the physically movable node is imputed to the parameter of the model.

\*   \*   \*   \*   \*